United States Patent
Mittal et al.

(10) Patent No.: US 9,495,629 B2
(45) Date of Patent: Nov. 15, 2016

(54) MEMORY CARD AND COMMUNICATION METHOD BETWEEN A MEMORY CARD AND A HOST UNIT

(75) Inventors: Alok Kumar Mittal, Delhi (IN); Deepak Naik, Uttar Karnataka (IN)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 604 days.

(21) Appl. No.: 12/974,179

(22) Filed: Dec. 21, 2010

(65) Prior Publication Data

US 2011/0153934 A1 Jun. 23, 2011

(30) Foreign Application Priority Data

Dec. 21, 2009 (IN) .......................... 2674/DEL/2009

(51) Int. Cl.
*G06F 5/06* (2006.01)
*G06K 19/077* (2006.01)
*G06F 3/06* (2006.01)

(52) U.S. Cl.
CPC ....... *G06K 19/07732* (2013.01); *G06F 3/0661* (2013.01); *G06F 5/06* (2013.01); *G06F 2213/3804* (2013.01); *G06F 2213/3852* (2013.01)

(58) Field of Classification Search
CPC ..................... G06F 3/08; G06F 3/0661; G06F 13/382–13/387; G06F 2213/3804; G06F 5/06–5/16; G06F 13/38–13/4059; G06F 2213/3852; G06K 19/07732

USPC .......... 710/33–35, 58–60; 711/103, 167–169
See application file for complete search history.

(56) References Cited

U.S. PATENT DOCUMENTS

| 5,191,653 | A | * | 3/1993 | Banks ................. G06F 13/4027 710/11 |
| 5,659,690 | A | * | 8/1997 | Stuber et al. ................. 710/307 |
| 5,758,057 | A | * | 5/1998 | Baba et al. .................. 714/6.32 |
| 6,557,065 | B1 | * | 4/2003 | Peleg et al. ................... 710/300 |
| 7,574,549 | B2 | | 8/2009 | Sherman |
| 2003/0046472 | A1 | * | 3/2003 | Morrow ........................ 710/305 |
| 2003/0193927 | A1 | * | 10/2003 | Hronik .......................... 370/351 |
| 2007/0045426 | A1 | * | 3/2007 | Shiota et al. ................. 235/492 |
| 2007/0071005 | A1 | * | 3/2007 | Mayhew et al. ............. 370/392 |
| 2007/0145154 | A1 | * | 6/2007 | Yu et al. ....................... 235/492 |

(Continued)

FOREIGN PATENT DOCUMENTS

EP 1 927 939 A1 4/2008

OTHER PUBLICATIONS

"SD Host vs. SPI Comparision," Sep. 2008, FPS-Tech.*

(Continued)

*Primary Examiner* — Nicholas Simonetti
(74) *Attorney, Agent, or Firm* — Allen, Dyer, Doppelt, Milbrath & Gilchrist, P.A.

(57) ABSTRACT

A memory card and a communication method between a memory card and a host unit are disclosed. High throughput of data between the memory card and the host unit is guaranteed by providing a communication interface between the memory card and the host unit including a first communication interface between a memory unit of the memory card and a control unit of the memory card and a second communication interface between the control unit of the memory card and the host unit.

21 Claims, 5 Drawing Sheets

(56) References Cited

U.S. PATENT DOCUMENTS

| | | | |
|---|---|---|---|
| 2007/0202749 A1* | 8/2007 | Bhat et al. .................... | 439/630 |
| 2008/0301366 A1* | 12/2008 | Yoshikawa ................... | 711/114 |
| 2009/0265505 A1* | 10/2009 | Yang .................. | G06F 12/0246 |
| | | | 711/103 |
| 2010/0017556 A1* | 1/2010 | Chin et al. .................... | 711/103 |
| 2010/0180162 A1* | 7/2010 | Cardwell ............ | G06F 11/0745 |
| | | | 714/47.1 |
| 2011/0041039 A1* | 2/2011 | Harari et al. ................. | 714/773 |

OTHER PUBLICATIONS

Technical Committee, "SD Specifications Part E1 SDIO Simplified Specification", Feb. 8, 2007, SD Card Association, Versino 2.00.*
John Garney, "An Analysis of Throughput Characteristics of Universal Serial Bus", Dec. 6, 1996, Media and Interconnect Technology, Intel Architecture Labs.*

* cited by examiner

MEMORY CARD AND COMMUNICATION METHOD BETWEEN A MEMORY CARD AND A HOST UNIT

RELATED CASES

The present application claims priority of India Application No. 2674/DEL/2009 filed Dec. 21, 2009, which is incorporated herein in its entirety by reference.

BACKGROUND OF THE INVENTION

1. Field of the Invention

The present invention relates to memory cards and to communication methods between memory cards and host units. In particular, the present invention relates to bridge implementations between memory cards and host units so as to realize high throughput of data.

2. Background of the Related Art

Memory cards are widely used nowadays for the purpose of storing several kinds of data such as video data, audio data, image data, text data and the like. Flash memory cards, for example, are solid state electronic flash memory data storage devices capable of storing digital contents and they are mainly used with digital cameras, personal computers, music players, video games consoles, laptops, and other electronic devices. They offer high rerecord ability, power free storage and, especially in recent times, they are characterized by very small dimensions.

Moreover, one of the most recent uses of memory cards is with mobile phones and similar small screen devices such as GPS, PDA, and smart phones that allows the reception and transmission of data in a wireless scenario. GPS, PDA, smart phones, and mobile phones use memory cards and smart cards. In particular, smart cards for mobile devices allow for support of reception and transmission of broadcasted signals and of broadcasted encrypted signals. Common examples of smart cards are the subscriber identity module cards typically used for mobile devices.

An example of a secure MMC (multi-media card) standard smart card with multi-application operation capability is disclosed in EP1927939A1. In particular, the system disclosed in this document allows starting, running and querying multiple applications in parallel and concurrently in a card connected to a host through a MMC bus. In particular, one of the main problems concerning the employment of memory cards in a wireless scenario together with devices adapted to support reception and transmission of broadcasted signals, such as video channels, radio channels and the like, relates to the speed at which the data can be transmitted from and to the memory card. In particular, the speed of data transmission from and to the memory card is connected with two main problems.

First of all, low speed data transmission implies very poor quality of the signal as output to the user. In particular, the quality at which the data content is displayed strongly depends on the speed at which the data can be transmitted from and to the memory card. Low speed transmission may, for instance, result in very slow reproduction of video and/or audio data.

A second problem concerning the data transfer speed relates to the fact that while occupied with the data transfer, the processor of the system is in a busy state and cannot process other kinds of commands. Accordingly, if the data transfer speed is too low, the processor is occupied for a long time and the entire device is overcharged by operations. Accordingly, the processor cannot perform other tasks and the device is slowed down.

Given these problems with the existing technology, it would be advantageous to provide a system which allows for the operation of memory cards in a wireless scenario in such a way so as to guarantee high quality data output and, at the same time, low workload for the processor of the system.

SUMMARY OF THE INVENTION

The present invention exploits the fact of providing a communication interface between the memory unit of the memory card and the host unit, said communication interface comprising a first communication interface between the memory unit of the card and a control unit of the card and a second communication interface between the control unit of the card and the host unit.

According to a first aspect of the invention, a memory card adapted to communicate with the host unit is provided, said memory card comprising a memory unit adapted to store data and a control unit adapted to control an operation of said memory unit, wherein said memory unit is further adapted to communicate with the host unit by means of a communication interface, said communication interface being adapted to transfer data between said memory unit and said host unit and said communication interface comprising a first communication interface between said memory unit and said control unit and a second communication interface between said control unit and said host unit.

According to a second aspect of the invention, the invention provides a communication method between a memory card and a host unit, said method comprising the steps of communicating between the memory unit of the memory card and a control unit of the memory card via a first communication protocol and communicating between the control unit of the memory card and the host unit via a second communication protocol, so as to transfer data between the memory unit and the host unit.

According to a third aspect of the invention, a communication method between a memory card and a host unit is provided, said method comprising the steps of transmitting data from a memory unit of the memory card to a control unit of the memory card by means of a first communication interface and transmitting said data from said control unit of said memory card to said host unit by means of a second communication interface, wherein transmission of the data from the control unit of the memory card to the host unit is performed upon retrieval of at least one portion of the data from the memory unit.

According to a fourth aspect of the present invention, a communication method is provided between a memory card and a host unit, said method comprising the steps of retrieving data from the host unit, transmitting said data from the host unit to a memory unit of the memory card comprising transmitting the data from a control unit of the memory card to the memory unit by means of a first communication interface after having transmitted the data from the host unit to the control unit by means of a second communication interface, transmitting a write command signal from the host unit to the memory unit of the memory card comprising transmitting the write command signal from the host unit to a control unit of the memory card by means of the second communication interface, wherein the transmission of the write command signal from the host unit to the control unit of the memory card by means of the second communication interface is performed upon retrieval of at least a portion of the data from the host unit.

BRIEF DESCRIPTION OF THE DRAWINGS

The accompanying drawings are incorporated into and form a part of a specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings in which like reference numbers refer to like elements and wherein.

DETAILED DESCRIPTION OF THE INVENTION

Figure 1:
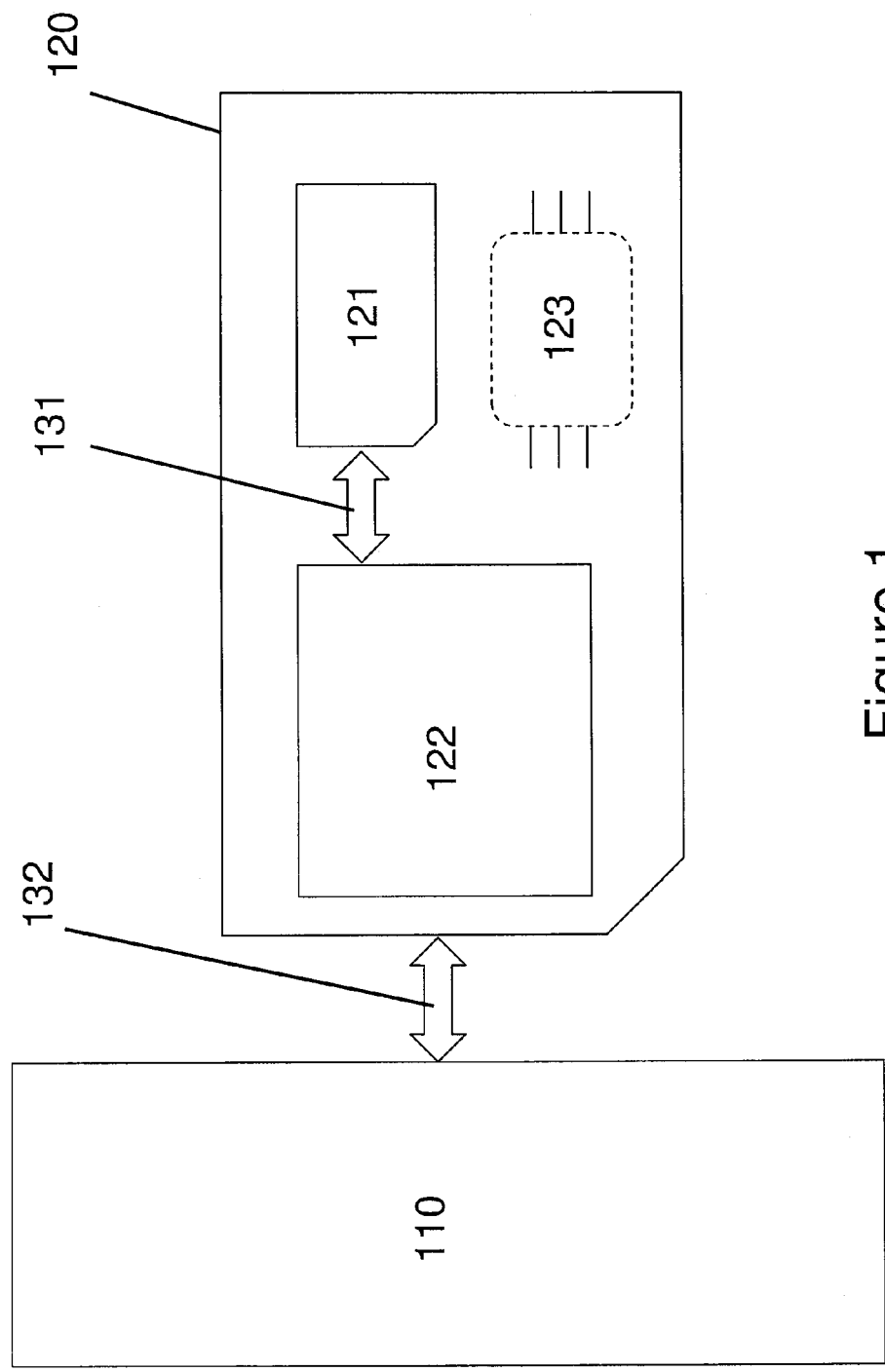
FIG. 1 schematically shows a memory card according to the present invention.

FIG. 1 schematically displays a memory card 120 according to an embodiment of the present invention and a host unit 110.

The host unit 110 may be housed in any kind of electronic device. In particular, the host unit 110 may be housed, for instance, in mobile devices adapted to operate in a wireless scenario such as laptops, mobile phones, PDAs, smart phones, GPS and the like. Moreover, the host unit 110 may be housed, for instance, in a personal computer or the like.

The memory card 120 comprises a memory unit 121 adapted to store data. In particular, the memory unit 121 may be adapted to store video data, audio data, images and other kinds of data such as text documents, presentation documents and the like.

According to an embodiment of the invention, the memory unit 121 may comprise a micro secure digital card: μSD card/MMC card or equivalent memory device.

The memory card 120 further comprises a control unit 122 adapted to control an operation of the memory unit 121.

According to an embodiment of the present invention, the control unit 122 may comprise a micro control unit (MCU).

The memory unit 121 is adapted to communicate with the host unit 110 by means of a communication interface. In particular, the communication interface between the memory unit 121 and the host unit 110 is adapted to transfer data between the memory unit 121 and the host unit 110. The transfer of data between the host unit 110 and the memory unit 121 can occur in both directions. In particular, data can be transferred from the host unit 110 to the memory unit 121 and/or from the memory unit 121 to the host unit 110.

As can be seen from FIG. 1, the communication interface between the memory unit 121 and the host unit 110 comprises a first communication interface 131 between the memory unit 121 and the control unit 122 of the memory card 120 and a second communication interface 132 between the control unit 122 of the memory card and the host unit 110.

In other words, the communication interface between the memory unit 121 of the memory card and the host unit 110 comprises a bridge between the memory unit 121 and the host unit 110 wherein the bridge comprises the first communication interface 131, the control unit 122 and the second communication interface 132.

The first communication interface 131 is adapted to operate at higher frequency than the second communication interface 132. In other words, the first communication interface 131 between the memory unit 121 and the control unit 122 is adapted to operate at higher frequency than the second communication interface 132 between the control unit 122 and the host unit 110.

According to an embodiment of the invention, the frequency of operation of the first communication interface 131 may be at least two times the frequency of operation of the second communication interface 132.

According to an embodiment of the invention, the frequency of operation of the first communication interface 131 may be 18 Mhz and the frequency of operation of the second communication interface may be 4.5 Mhz.

Since the first communication interface 131 operates at higher frequency than the second communication interface 132, the control unit 122 can provide data to the host unit 110 even if the data are not completely downloaded from the memory unit 121 to the control unit 122 as will be described in detail below. In other words, the control unit 122 can start providing data to the host unit 110 even if the control unit 122 has not yet received the complete packet of data to be transferred from the memory unit 121. Since the second communication interface 132 operates at lower frequency than the first communication interface 131, once the control unit 122 has received a portion of the data to be transferred from the memory unit 121 to the host unit 110 through the first communication interface 131, the control unit 122 can start transferring the portion of data received to the host unit 110 through the second communication interface 132. The higher speed of the first communication interface 131 guarantees that the control unit 122 is provided with the remaining portions of data to be transferred to the host unit 110.

The control unit 122 may be provided with a buffer for temporarily holding the data to be transferred.

The first communication interface 131 and the second communication interface 132 may be compliant to at least one standard of the MMC card/SD (secure digital) card interface family of standards. For example, they may be compliant to the ISO/IEC7816 standard.

According to an embodiment of the invention, the first communication interface 131 comprises a first serial peripheral interface SPI1 and the second communication interface comprises a second serial peripheral interface SPI2. The first serial peripheral interface SPI1 may be, for instance, clocked on a clock signal having a higher frequency than the clock signal of the second serial peripheral interface SPI2. The frequency of the clock signal of the first peripheral interface SPI1 may by twice the frequency of the clock signal of the second peripheral interface SPI2.

According to a further embodiment of the invention, the first communication interface 131 comprises a 4-bit Secure Digital Input/Output bus (4bSDIO bus) and the second communication interface 132 comprises a serial peripheral interface SPI.

According to a further embodiment of the invention, the first communication interface 131 comprises a first 4-bit Secure Digital Input/Output bus (4bSDIO bus) and the second communication interface comprises a second 4-bit Secure Digital Input/Output bus (4bSDIO bus). The first 4-bit Secure Digital Input/Output bus may be for instance adapted to operate at higher frequency than the second 4-bit Secure Digital Input/Output bus. The frequency of the first 4-bit Secure Digital Input/Output bus may be twice the frequency of the second 4-bit Secure Digital Input/Output bus.

As can be seen in FIG. 1, the memory card 120 may further comprise a smart card unit 123 adapted to support reception and transmission of broadcasted signals. In particular, the smart card unit 123 may be adapted to support reception and transmission of broadcasted encrypted signals. The smart card unit 123 may for instance comprise a Subscriber Identity Module card.

Moreover, the smart card unit 123 may be adapted not only for supporting reception of broadcasted encrypted signals or of broadcasted signals, but also to support transmission of broadcasted signals and/or broadcasted encrypted signals such as user identification signals, personal identification data, credit card data and/or bank account data. The smart card unit 123 may be further adapted for instance to perform electronic commerce (e-commerce) operations. The smart card unit 123 may be adapted to support any kind of e-commerce transaction.

Figure 2:
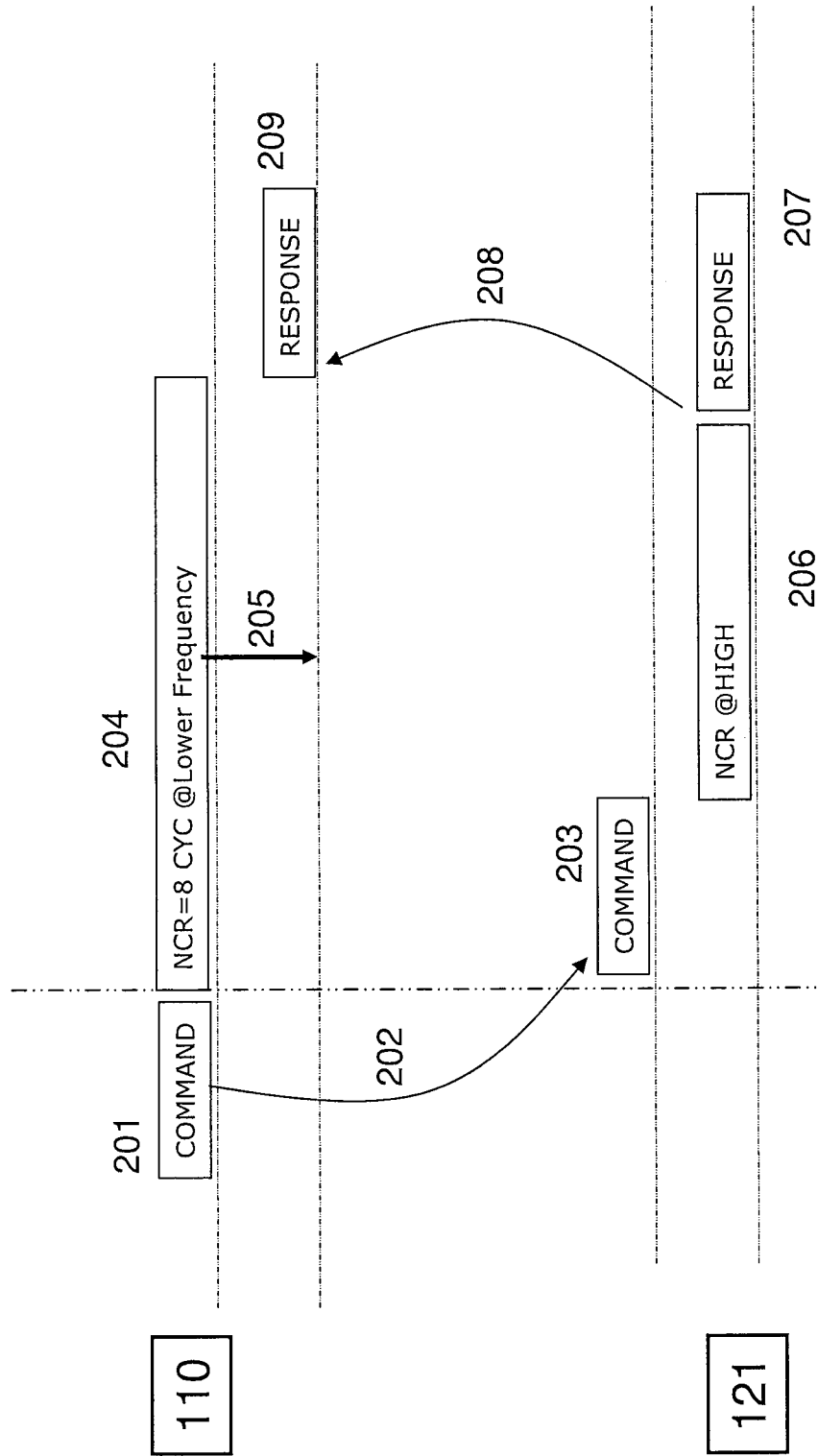
FIG. 2 schematically shows the command and response handling of a system according to an embodiment of the present invention.

FIG. 2 schematically displays the handling of command and response according to an embodiment of the present invention.

In particular, the memory card 120 may be adapted to exchange commands/responses with the host unit 110 wherein the command and responses are compliant with at least one standard of the MMC/SD card family of standards. According to an embodiment of the invention, the command may comprise the command header, arguments and the data for a cyclic redundancy check CRC, for instance for a cyclic redundancy check CRC7. The response comprises the response data against the command.

As can be seen in FIG. 2, the host unit 110 issues a command 201 which is subsequently delivered to the memory unit 121 via the communication interface between the host unit 110 and the memory unit 121 of the memory card 120 as schematically shown by arrow 202 in FIG. 2. In particular, the command issued by the host unit 110 may be delivered to the control unit 122 of the memory card 120 via the second communication interface 132 and then from the control unit 122 to the memory unit 121 via the first communication interface 131.

As per the standard, once the command 201 has been issued from the host unit 110, the host unit 110 waits for a response for a time corresponding to the card response time (NCR). NCR may correspond to a pre-determined number of clock cycles wherein the clock operates at the frequency of the second communication interface 132. This is shown by the bar 204 in FIG. 2. During this time, the host unit 110 keeps polling over the second communication interface 132 for a response as schematically shown by arrow 205 in FIG. 2.

According to an embodiment of the invention, following the sending of a command, there is a delay called the card response time (NCR) which can take 1 to 8 bytes depending on the command. In the example shown in FIG. 2, the delay takes 8 bytes and it is executed via the second communication interface 132 operating at low frequency.

When the command has reached the memory unit 121 as shown by box 203 in FIG. 2, the memory unit 121 operates through the first communication interface 131 at high frequency as shown by box 206 in FIG. 2 in order to provide the response 207 within the NCR time of the host unit 110, i.e. of the second communication interface.

When the response 207 is available, it is provided to the host as schematically shown by arrow 208 in FIG. 2 so that the host is provided with the response 209 within the time limit given by NCR.

Since the first communication interface 131 operates at higher frequency than the second communication interface 132, the memory unit 121 provides the response within the NCR time of the host unit 110.

In other words, the host unit 110 expects a response within the specified time NCR. In order to ensure that the host 110 is provided within this time with a response, the first communication interface 131 operates at higher frequency than the second communication interface 132. Accordingly, the response 209 is provided to the host unit 110 within the required time. As can be seen in FIG. 2, the box 206 representing the operation over the first communication interface 131 is in fact shorter than the box 204 representing the operation over the second communication interface 132 because the operation over the first communication interface 131 is managed at higher frequency than the operation over the second communication interface 132.

Figure 3:
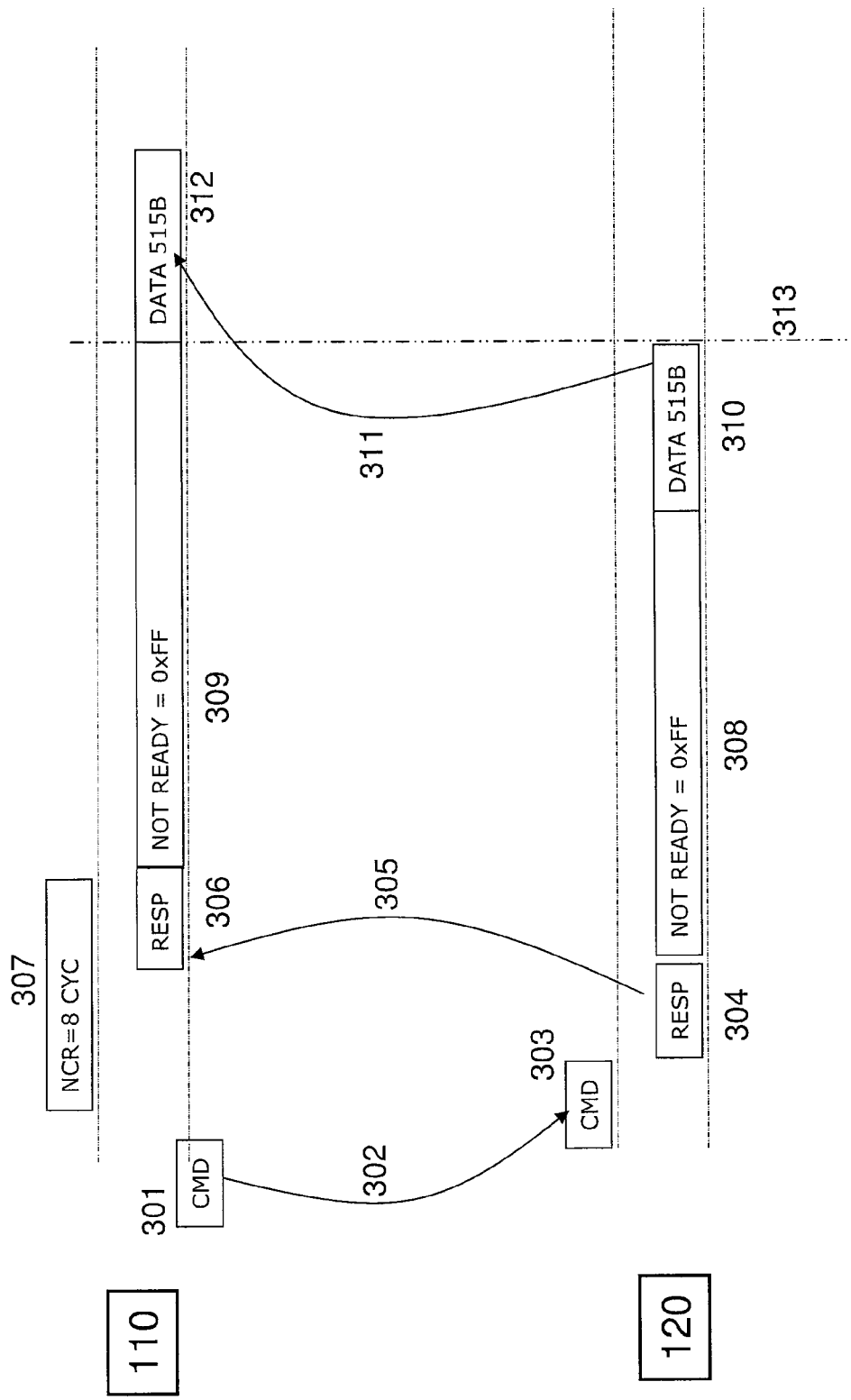
FIG. 3 schematically shows the read operation of a system according to the prior art.

FIG. 3 schematically shows the read operation according to the prior art. In particular, the operations of the host unit 110 and of a memory card 120 are schematically shown. The host unit 110 issues a command 301 on communication interface 132 which is delivered to the communication interface 131 as schematically shown by arrow 302 in FIG. 3. In particular, the command 301 in the present case is a read command, for instance as part of the secure MMC 2.0 standard and or its variations. For instance, the read command is a means to retrieve data from said memory unit 121. The host expects a response from the card 120 within the time NCR as shown by box 307. As soon as the memory unit 121 has issued a response 304, the response is provided to the host 110 as shown by arrow 305. After issuing the response 304, the memory unit 121 elaborates the command received by the host 110 and remains in a not ready status as shown by box 308. The not ready status corresponds to the time necessary for retrieving the data 310 to be read.

When the entire packet of data 310 is available, it is delivered to the host unit 110 as schematically shown by arrow 311 in FIG. 3. In other words, when the buffer on the card side is full, the data 310 are delivered to the host unit 110. Line 313 represents the time of the delivery of the data from the card 120 to the host unit 110.

According to this scheme, the delivery of data requires a long time. In particular, the status of the host unit 110 is set to not ready for a time corresponding to the time for retrieving the entire packet of data 310 from the card 120 and for filling the buffer on the card side.

Figure 4:
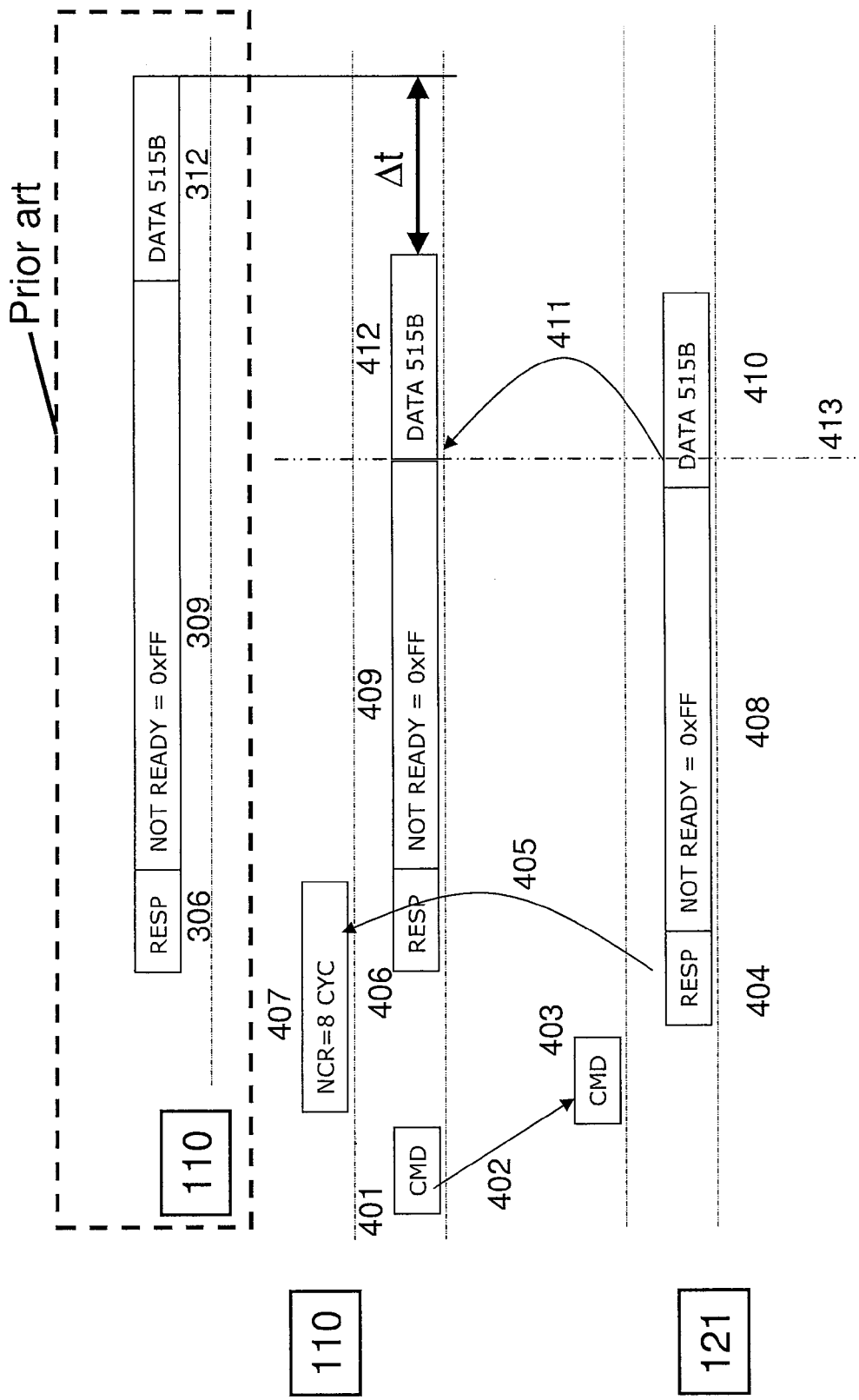
FIG. 4 schematically shows the read operation according to an embodiment of the present invention and the comparison with the read operation according to the prior art.

FIG. 4 schematically displays the read mode according to an embodiment of the present invention.

The host unit 110 issues a command 401 which is delivered to the memory unit 121 of the memory card 120. The command may be, for example, a read command according to the secure MMC 2.0 standard or to its variations. Once the command 401 has been issued and delivered to the memory unit 121 as shown by arrow 402 in FIG. 4, the host waits for a response within a time NCR as shown by bar 407. During this time, the host unit 110 polls for a response as explained with reference to FIG. 2.

The memory unit 121 issues a response 404 and delivers it to the host unit 110 as shown by arrow 405 in FIG. 4. After issuing the response, the memory unit 121 switches to a not ready state 408 until it starts to retrieve the data 410. In particular, according to the present invention, the data are sent to the host unit 110 as soon as only a portion of the data is available. In particular, line 413 displays the time of start of delivery of the data from the memory unit 121 to the host unit 110. The data 410 are delivered to the host unit 110 as schematically shown by arrow 411 in FIG. 4. In particular, according to the present invention, the delivery of data starts before the entire packet of data is available. In other words, according to the present invention it is not necessary to wait for the buffer on the card side to be full before transmitting the data to the host 110.

A first portion of the data is delivered from the memory unit 121 to the control unit 122 via the first communication interface 131. As soon as the memory unit 121 receives the first portion of the data, it can further deliver it to the host unit 110 via the second communication interface 132. Since the first communication interface 131 operates at higher frequency than the second communication interface 132, the control unit 122 is provided the portions of data by the memory unit 121, to be sent to the host unit 110. In other words, the control unit 122 provides the data to the host unit 110 even if the buffer of the control unit 122 is not full. The portions of data coming from the memory unit 121 at high frequency via the first communication interface 131 guarantee that the memory unit 121 is provided with portions of data to deliver to the host unit 110 via the second communication interface 132 operating at lower frequency than the first communication interface 131. The ratio of the frequency of the first communication interface 131 and the frequency of the second communication interface 132 ensure that data is available in the control unit 122 for delivery to the host unit 110.

The upper portion of the figure in the dashed box displays the situation in the case of the prior art depicted on the same time scale as the lower portion of the figure. As can be seen, the data 312 are received by the host unit 110 according to the prior art with a delay corresponding to Δt with respect to the present invention. The delay in the prior art is due to the fact that according to the prior art the data are sent from the memory card 120 to the host unit 110 only when the full packet is available, i.e. when the buffer on the card side is full.

According to the system of the prior art, the host unit 110 is in a not ready state for a longer time than according to the present invention as can be seen comparing boxes 309 and 409 in FIG. 4.

As an example, the data to be transferred from the memory unit 121 to the host unit 110 may be video data, audio data or any other kind of data stored in the memory unit 121. For instance, the data is stored sequentially in different pages wherein each of the pages has a size of 512 bytes. According to the prior art, transmission occurs only when the entire single page is available. According to the present invention, on the contrary, the transfer occurs as soon as a portion of each single page is available.

For example, as soon as the start of frame value SOF 0xFE is available, the transfer of the data occurs. The transfer may, for instance, start as soon as the Start of Block Token is received.

Accordingly, as soon as the control unit 122 receives the start of frame value (SOF) from the memory unit 121, the control unit 122 starts delivering the data to the host unit 110 at low frequency (via the second communication interface 132) and receives the data from the memory unit 121 at high frequency (via the first communication interface 132).

The speed ratio between the first communication interface 131 and the second communication interface 132 ensures that the data is always available to the control unit 122 to send it to the host unit 110 via the second communication interface 132.

Time Δt is gained with respect to the prior art configuration because it is not necessary to wait for the buffer of the control unit 122 to be full before starting transmitting the data.

According to the present invention, a communication method between a memory card 120 and a host unit 110 is therefore provided, said method comprising the steps of communicating between a memory unit 121 of the memory card 120 and a control unit 122 of the memory card 120 via a first communication protocol and communicating between the control unit 122 of the memory card 120 and the host unit 110 via a second communication protocol so as to transfer data between the memory unit 121 and the host unit 110. The first protocol is adapted to transfer data at higher speed than the second protocol. According to a particular example, the speed of the data transfer according to the first protocol is as least two times the speed of the data transfer according to the second protocol.

According to an embodiment of the invention, the frequency of operation of the first communication interface 131 may be 18 Mhz and the frequency of operation of the second communication interface may be 4.5 Mhz.

According to a further embodiment of the present invention, a communication method between a memory card 120 and a host unit 110 is provided wherein the method comprises the steps of transmitting data from a memory unit 121 of the memory card 120 to a control unit 122 of the memory card 120 by means of a first communication interface 131 and transmitting said data from said control unit 122 of said memory card 120 to the host unit 110 by means of a second communication interface 132 wherein transmission of said data from said control unit 122 of said memory card 120 to said host unit 110 is performed upon retrieval of at least one portion of said data from said memory unit.

The first communication interface 131 may be adapted to operate at higher frequency than the second communication interface 132. The frequency of the first communication interface 131 may be, for example, at least two times the frequency of the second communication interface 132.

According to an embodiment of the invention, the frequency of operation of the first communication interface 131 may be 18 Mhz and the frequency of operation of the second communication interface may be 4.5 Mhz.

Figure 5:
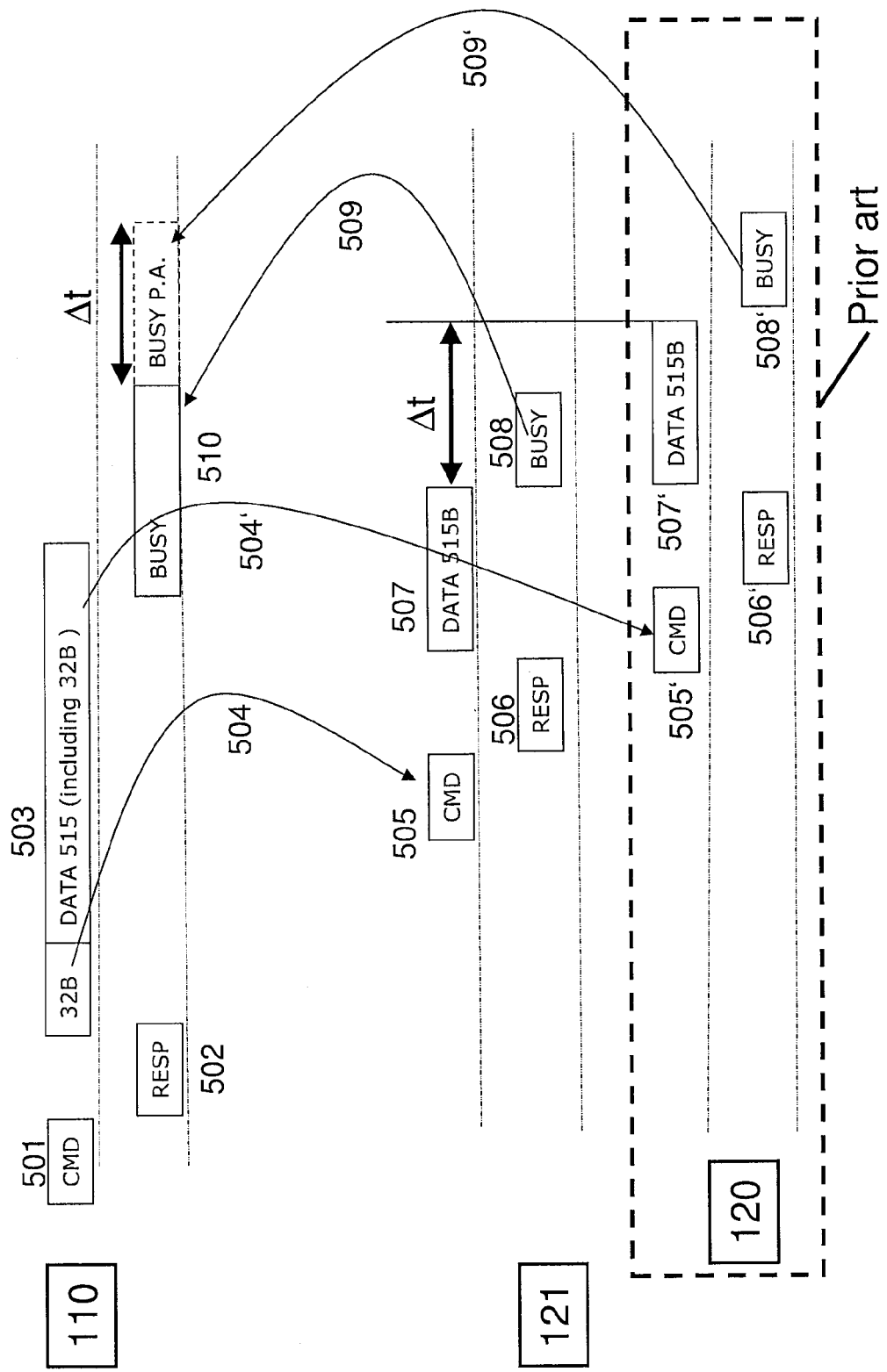
FIG. 5 schematically shows the write operation according to an embodiment of the present invention and a comparison with the write operation according to the prior art.

FIG. 5 schematically shows the write operation according to an embodiment of the present invention.

The write command 501 is issued from host unit 110 and a response 502 is obtained. The command may be, for example, a write command according to the secure MMC 2.0 standard or to its variations.

As shown in the figure, as soon as a first portion of the data shown in box 503 is available, the command is delivered to the memory unit 121 as shown by arrow 504 in the figure. The memory unit 121 issues a corresponding response 506 and the data 507 are written. When the writing process is done, the memory unit 121 ends its busy state 508.

Accordingly, the host unit 110 ends the busy state 510 as schematically shown by arrow 509.

The first portion of the data shown in box 503 is, for example, the start of packet value SOF of the data. FIG. 5 shows that this portion may, for instance, have a size of 32 bytes.

The first portion of the data may, for instance, comprise the so called Magic Word which is a specific sequence of data embedded inside the 512 bytes of data. The Magic Word helps to recognize if the command is for memory unit 121 or if it is for the smart card 123.

For example, in fact, the system according to the present invention may be employed when it is necessary to interface a smart card and a memory unit on the same card. This is, for instance, the case for prepaid mobile TV. In these cases, the e-commerce transactions are done using the smart card unit while the memory is required for storing audio, video and other kinds of data. This implementation needs sharing of the interface between the card 120 and the host unit 110. According to the configuration of the present invention, as soon as the 32 bytes of data are received at the control unit 122 from the host unit 110 via the second communication interface 132, the Magic Word test is performed. Depending on this test, the command and the data are stored via the first communication interface 131 on the memory unit 121 at a high speed. Since the first communication interface 131 operates at higher frequency than the second communication interface 132, time is recovered and once all available data are available, the control unit 122 works in wait mode and can send the data received from the host unit 110 to the memory unit 121 via the first communication interface 131. This ensures that the bridge between the host unit 110 and the memory unit 121 gives high throughput.

In the bottom part of FIG. 5, the situation for the prior art is shown in the dashed box on the same time scale as in the upper portion of the figure. The command 505' and the response 506' on the card side 120 are delayed with respect to the corresponding command 505 and response 506 in the memory unit 121 of the memory card according to the present invention. In particular, this is due to the fact that in the system of the prior art, the interface between the card and the host operates at low speed so that the data 507' are written on the card with a delay Δt with respect to the present invention. Accordingly, the host unit 110 is busy for a longer time than in the present invention. This is shown by box 510 which displays that, according to the present invention, the host unit 110 is in a busy state for a shorter time compared to the case of the prior art. The host unit 110 is in fact kept busy until the operation on the card side is finished.

According to the present invention, therefore, a communication method between a memory card 120 and a host unit 110 is provided, said method comprising the steps of retrieving data from the host unit 110, transmitting said data from said host unit 110 to a memory unit 121 of said memory card 120 comprising transmitting the data from a control unit 122 of the memory card 120 to the memory unit 121 by means of a first communication interface 131 after having transmitted the data from the host unit 110 to the control unit 122 by means of a second communication interface 132 and transmitting of a write command signal from said host unit 110 to said memory unit 121 of said memory card 120 comprising transmitting the write command signal from the host unit 110 to a control unit 122 of the memory card 120 by means of the second communication interface 132 wherein the transmission of the write command signal from the host unit 110 to the control unit 122 of the memory card 120 by means of the second communication interface 132 is performed upon retrieving of at least a portion of said data form the host unit 110.

The at least one portion of the data may comprise the start of packet value of the data. For example, the at least one portion of the data may comprise the so called Magic Word portion of the data.

The first communication interface 131 is adapted to operate at a higher frequency than the second communication interface 132. In particular, according to a particular embodiment of the invention, the frequency of the first communication interface 131 is at least two times the frequency of the second communication interface 132.

According to an embodiment of the invention, the frequency of operation of the first communication interface 131 may be 18 Mhz and the frequency of operation of the second communication interface may be 4.5 Mhz.

The present invention allows obtaining high data throughput between the host unit and the memory card.

According to the present invention, for instance, a smart card adapted to be interfaced to a mobile-baseband processor of a mobile device adapted to operate in a wireless environment is provided. In particular, a smart card unit may be embedded with a µSD/MMC card device. The µSD/MMC card device is also employed for storing, for instance, audio and video clips. Throughput of, for instance, 1 Mbps can be achieved so that the user can visualize the data at high speed and with good quality. Moreover, since the time of data transfer is short, the processor of the system is not overloaded with tasks to perform.

While the invention has been described with respect to the preferred physical embodiments constructed in accordance therewith, it will be apparent to those skilled in the art that various modifications, variations and improvements of the present invention may be made in light of the above teachings and within the purview of the appended claims without departing from the spirit and intended scope of the invention.

For instance, any kind of data can be handled by the system according to the present invention.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

We claim:

1. A memory card adapted to communicate with a host unit, the memory card comprising:
   a memory unit configured to store data;
   a first direct communications interface coupled to said memory unit; and
   a control unit coupled to said memory unit via said first direct communications interface and configured to
      control an operation of said memory unit via said first direct communications interface, and
      communicate with the host unit via a second communication interface between said control unit and the host unit, the second communication interface being configured to transfer data at a frequency lower than a frequency of said first direct communications interface so that communication with the host unit begins once a portion of the data to be transferred is communicated from said memory unit,
      receive a command from the host unit via the second communication interface, the host unit configured to wait a threshold time period for a response to the command corresponding to a memory card response time in terms of a number of cycles of a clock, the clock operating at a frequency of the second communication interface, and the threshold time period being based upon the frequency of the second communication interface, cooperate with said memory unit via the first direct communications interface to provide the response to the command based upon the frequency of the first direct communications interface so that the response is provided within the threshold time period, and send the response to the host unit within the threshold time period via the second communication interface, wherein the response would not be within the threshold time period if the frequency of the first communications interface was lower than the frequency of the second communications interface.

2. The memory card according to claim 1, wherein the frequency of said first direct communication interface is at least two times the frequency of said second communication interface.

3. The memory card according to claim 1, wherein said memory unit comprises a micro Secure Digital card.

4. The memory card according to claim 1, wherein said first direct communication interface comprises a first serial peripheral interface and said second communication interface comprises a second serial peripheral interface.

5. The memory card according to claim 1, wherein said first direct communication interface comprises a 4 bit Secure Digital Input/Output bus and said second communication interface comprises a serial peripheral interface.

6. The memory card according to claim 1, wherein said first direct communication interface comprises a first 4 bit Secure Digital Input/Output bus and said second communication interface comprises a second 4 bit Secure Digital Input/Output bus.

7. A communication method between a memory card and a host unit, the method comprising:

communicating between a memory unit of the memory card and a control unit of the memory card via a first direct communication interface; and communicating between the control unit of the memory card and the host unit via a second communication interface so as to transfer data between the memory unit and the host unit at a frequency lower than a frequency of the first direct communication interface so that communication with the host unit begins once a portion of the data to be transferred is communicated from the memory unit;

wherein communicating between the control unit and the host unit comprises receiving a command from the host unit via the second communication interface, the host unit waiting a threshold time period for a response to the command corresponding to a memory card response time in terms of a number of cycles of a clock, the clock operating at a frequency of the second communication interface, and the threshold time period being based upon the frequency of the second communication interface;

wherein communicating between the memory unit and the control unit comprises communicating via the first direct communications interface to provide the response to the command based upon the frequency of the first direct communications interface so that the response is provided within the threshold time period;

wherein communication between the control unit and the host unit comprises sending the response to the host unit within the threshold time period via the second communication interface, and wherein the response would not be within the threshold time period if the frequency of the first communications interface was lower than the frequency of the second communications interface.

8. The communication method according to claim 7, wherein a speed of data transfer via the first direct communication interface is at least two times a speed of data transfer via the second communication interface.

9. The communication method according to claim 7, wherein the memory unit comprises a micro Secure Digital card.

10. The communication method according to claim 7, wherein the first direct communication interface comprises a first serial peripheral interface bus and the second communication interface comprises a second serial peripheral interface bus.

11. The communication method according to claim 7, wherein the first direct communication interface comprises a 4 bit Secure Digital Input/Output bus and the second communication interface comprises a serial peripheral interface bus.

12. The communication method according to claim 7, wherein the first direct communication interface comprises a first 4 bit Secure Digital Input/Output bus and the second communication interface comprises a second 4 bit Secure Digital Input/Output bus.

13. The communication method according to claim 7, wherein the portion of the data to be transferred comprises a start of packet value of the data.

14. A communication method between a memory card and a host unit, said method comprising:

retrieving data from said host unit, the data comprising a command, and the host unit waiting a threshold time period for a response to the command corresponding to a memory card response time in terms of a number of cycles of a clock, the clock operating at a frequency of a second communication interface, and the threshold time period being based upon a frequency of the second communication interface;

transmitting the data from the host unit to a memory unit of the memory card, transmitting the data comprising transmitting the data from a control unit of the memory card to the memory unit by a first direct communication interface to generate the response after having transmitted the data from the host unit to the control unit by the second communication interface, the response being generated based upon a frequency of the first direct communications interface so that the response is provided within the threshold time period;

sending the response to the host unit within the threshold time period via the second communication; and transmitting a write command signal from the host unit to the memory unit of the memory card, the transmitting of the write command signal comprising transmitting the write command signal from the host unit to the control unit of the memory card by the second communication interface;

the transmission of the write command signal from the host unit to the control unit of the memory card by the second communication interface being performed upon retrieving of at least a portion of the data from the host unit;

the frequency of the first communication interface being higher than the frequency of the second communication interface such that the response would not be within the threshold time period if the frequency of the first communications interface was lower than the frequency of the second communications interface.

15. The communication method according to claim 14, wherein the at least one portion of said data comprises the start of packet value of said data.

16. The communication method according to claim 14, wherein a frequency of the first direct communication interface is at least two times the frequency of the second communication interface.

17. The communication method according to claim 14, wherein the memory unit comprises a micro Secure Digital card.

18. The communication method according to claim 14, wherein the first direct communication interface comprises a first serial peripheral interface and the second communication interface comprises a second serial peripheral interface.

19. The communication method according to claim 14, wherein the first direct communication interface comprises a 4 bit Secure Digital Input/Output bus and the second communication interface comprises a serial peripheral interface.

20. The communication method according to claim 14, wherein the first direct communication interface comprises a first 4 bit Secure Digital Input/Output bus and the second communication interface comprises a second 4 bit Secure Digital Input/Output bus.

21. The communication method according to claim 14, wherein the control unit comprises one of a microcontroller, a micro-processor, and a digital signal processor (DSP).

* * * * *